(12) United States Patent
Bouchard

(10) Patent No.: US 9,470,338 B2
(45) Date of Patent: Oct. 18, 2016

(54) PIPE JOINING DEVICE

(71) Applicant: Benoit Bouchard, Lac-Beauport (CA)

(72) Inventor: Benoit Bouchard, Lac-Beauport (CA)

( * ) Notice: Subject to any disclaimer, the term of this patent is extended or adjusted under 35 U.S.C. 154(b) by 0 days.

(21) Appl. No.: 14/282,521

(22) Filed: May 20, 2014

(65) Prior Publication Data

US 2015/0337986 A1    Nov. 26, 2015

(51) Int. Cl.
  *B25B 5/14* (2006.01)
  *F16L 1/09* (2006.01)
  *F16L 1/10* (2006.01)
  *B25B 27/10* (2006.01)

(52) U.S. Cl.
  CPC .................. *F16L 1/09* (2013.01); *B25B 5/147* (2013.01); *B25B 27/10* (2013.01); *F16L 1/10* (2013.01); *Y10T 29/53796* (2015.01)

(58) Field of Classification Search
  CPC ........... B25B 1/02; B25B 1/20; B25B 1/205; B25B 5/02; B25B 5/06; B25B 5/068; F16L 1/09
  See application file for complete search history.

(56) References Cited

U.S. PATENT DOCUMENTS

| | | | | |
|---|---|---|---|---|
| 2,688,351 A * | 9/1954 | Sweet | ..................... | B25B 5/068 269/208 |
| 2,691,211 A * | 10/1954 | Leiber | ..................... | B25B 27/06 254/108 |
| 2,719,695 A * | 10/1955 | McKee | ..................... | F16L 1/09 254/109 |
| 3,308,529 A * | 3/1967 | Swanda | ..................... | F16L 1/09 29/237 |
| 3,414,961 A * | 12/1968 | Bjalme | ..................... | F16L 1/09 29/237 |
| 3,426,417 A * | 2/1969 | Austin | ..................... | F16L 1/09 29/237 |
| 3,435,507 A * | 4/1969 | Pronovost | ..................... | F16L 1/09 29/237 |
| 3,653,115 A * | 4/1972 | Perkins | ..................... | F16L 1/09 254/29 R |
| 3,710,427 A * | 1/1973 | Doty | ..................... | F16L 1/09 29/237 |
| 3,988,819 A * | 11/1976 | Sato | ..................... | F16L 1/09 29/237 |
| 4,598,452 A * | 7/1986 | Iseki | ..................... | B25B 27/02 29/237 |

* cited by examiner

*Primary Examiner* — Joseph J Hail
*Assistant Examiner* — Tyrone V Hall, Jr.
(74) *Attorney, Agent, or Firm* — Norton Rose Fulbright Canada LLP; Alexandre Daoust

(57) ABSTRACT

A device 20 used to join two pipes 22,22' positioned end to end. The device comprises two parallel jaws 24,24' holding the pipes mounted in combination with means of rods 28 linking the two jaws. One jaw is fixed 24 while the other jaw is mobile 24'; at least one rod is provided with means of rack wherein means of pinions 34 are moved while pulling the mobile jaw 24' towards or away from the fixed jaw until the pipes are connected. Each jaw is provided with means of spacing 42 their claws for adjusting their opening with the section of the pipes. Those means of spacing claws comprise a transversal bar 44 mounted between the claws and adapted to move, transversally along longitudinal slots made in the claws, thus spacing or moving closer the claws and then determining a sufficient opening corresponding with the pipe section.

5 Claims, 8 Drawing Sheets

PIPE JOINING DEVICE

BACKGROUND OF THE INVENTION

This invention relates to pipe joining devices which are used to link two pipes from different sections together.

PRIOR ART

A previous Canadian patent application no. 2816196 for the same invention was filed on May 21, 2013 by the same author.

OBJECTIVES AND ADVANTAGES

There is a need in the market of pipes for a device allowing to easily and quickly join two pipes together by minimizing preliminary regulations before utilization.

Our device allows connection of pipes from small to large sections.

Our device always maintains the two pipes horizontally during the junction, contrary to other devices where pipes must flex to facilitate insertion, thus damaging pipes, and more particularly inside the receiving pipe.

DESCRIPTION OF OUR CONCEPT

Our device comprises:
two parallel jaws, a first jaw is fixed and a second is mobile, the jaws are used for holding firmly two pipes destined to be joined together.
Means of displacement rods linking the two jaws, at least one rod is provided with rack means.
Means of pinions moving along the rack means and pulling the mobile jaw towards (or away) the fixed jaw until, the pipes held by the jaws are joined.
The means of pinions may be installed on the rods: between the two jaws or behind the mobile jaw for not interfering with the joining of pipes.
  A stopping device is used on the means of pinions and allows to maintain the mobile jaw in a position on the rack.
Means of spacing the claws of a jaw to adjust their opening according to the pipe section. Those means comprise a transversal spacing bar mounted between the claws and adapted to move vertically along longitudinal slots made on each claw, thus spacing or moving closer the claws and then determining a sufficient opening of the jaw corresponding with the pipe section.
The transversal displacement of the spacing bar is done by actioning a handle which actions a set of three stalks pivotingly connected:
a stalk linked with the handle;
the handle's stalk actions a first stalk moving the spacing bar;
A second stalk is linked with means of fastening disposed on a graduated rod. Varying the positions of the fastening moves the spacing bar upwardly or downwardly.
Claws and spacing bar may be provided with toothed pieces for a better adherence of the pipe against the claws and the spacing bar.

The present invention will be further understood from the following description with reference to the drawings wherein like numbers refer to like parts for easy identification.

BRIEF DESCRIPTION OF DRAWING FIGURES

Figure 1:
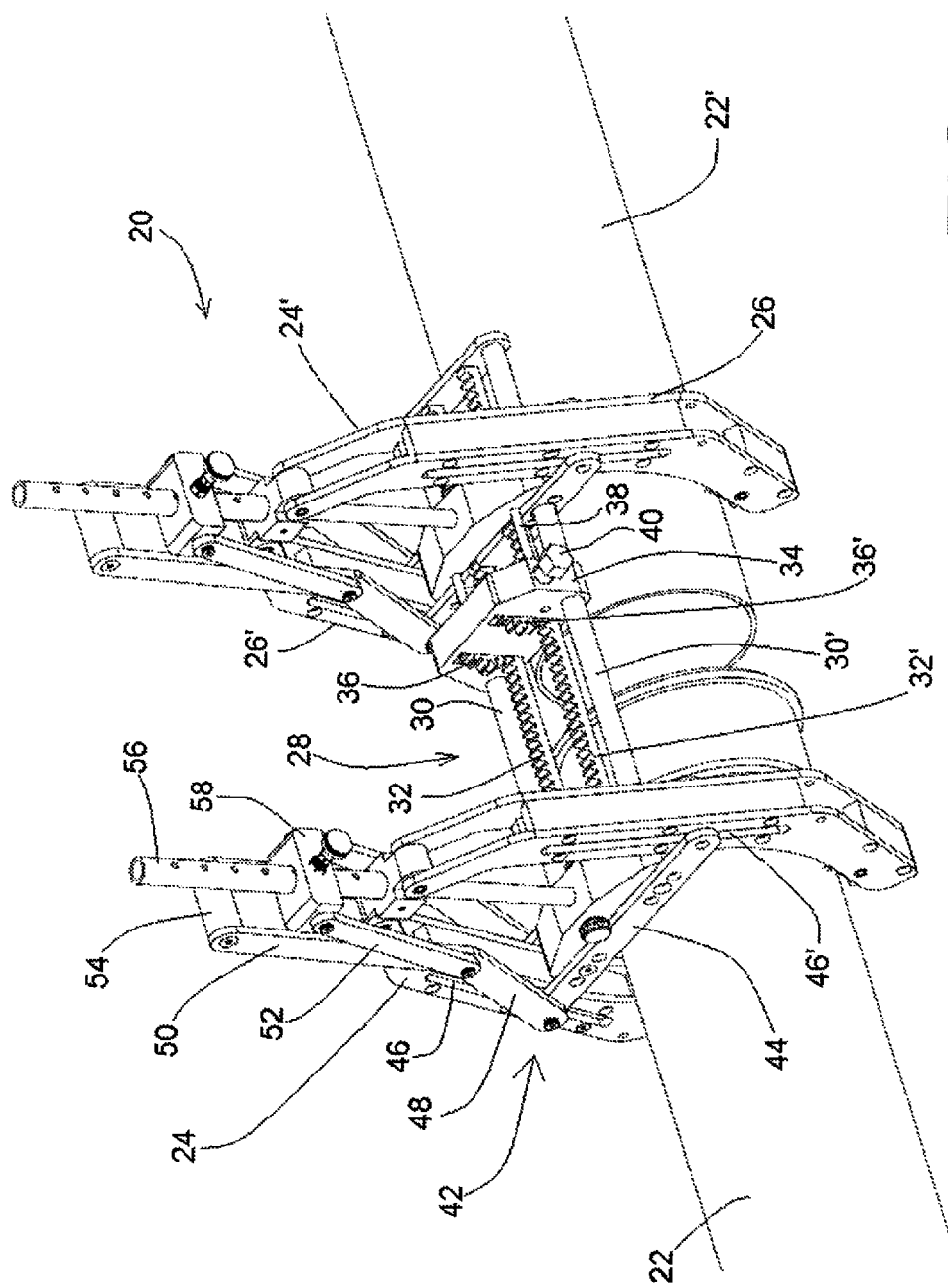
Figure 2:
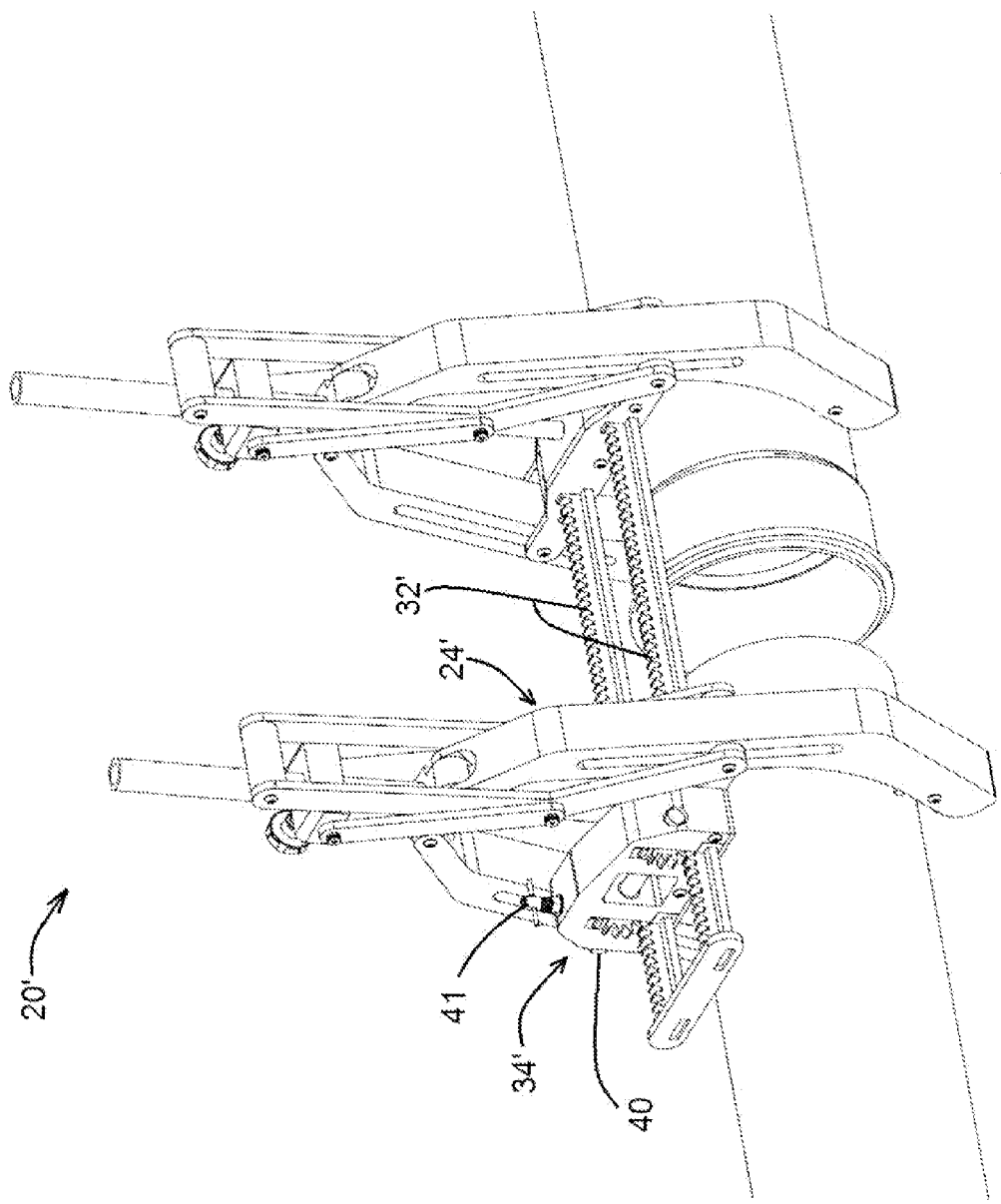
Figure 3:
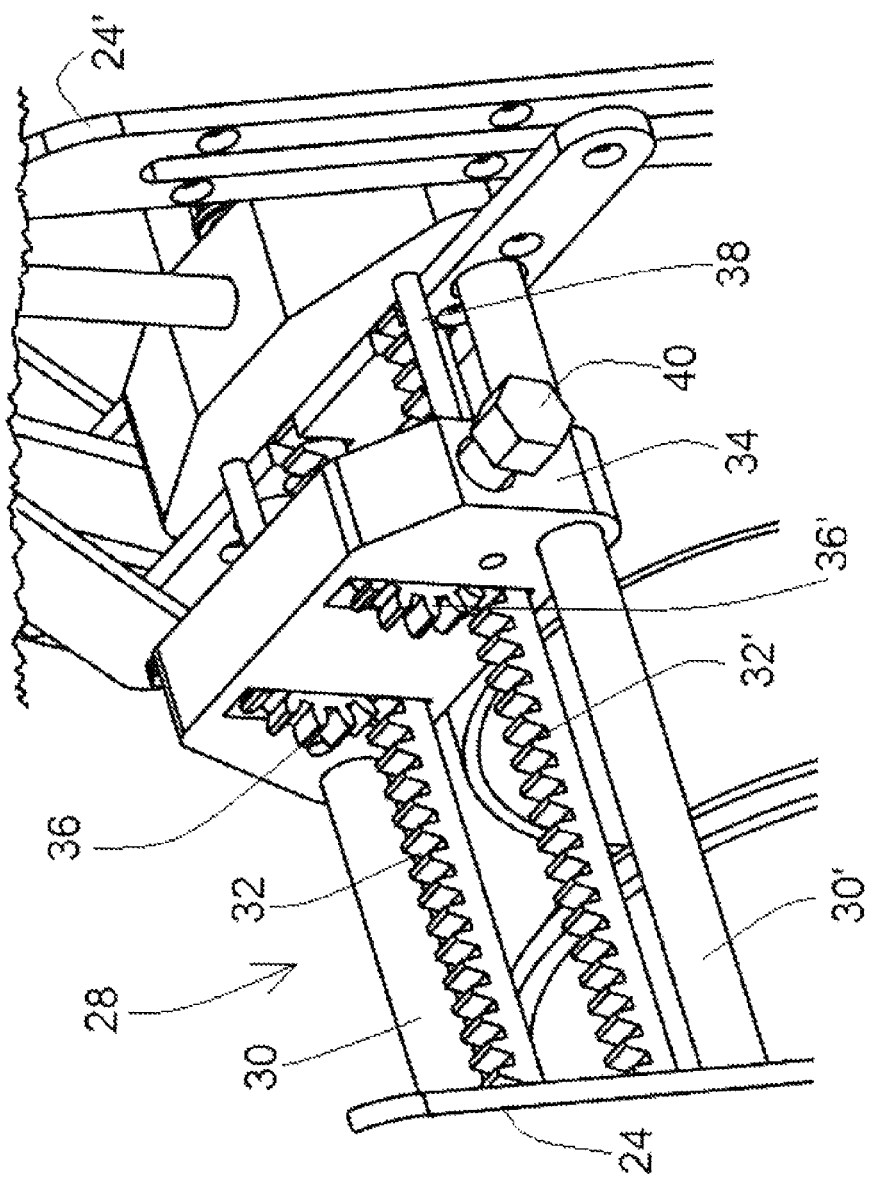
Figure 4:
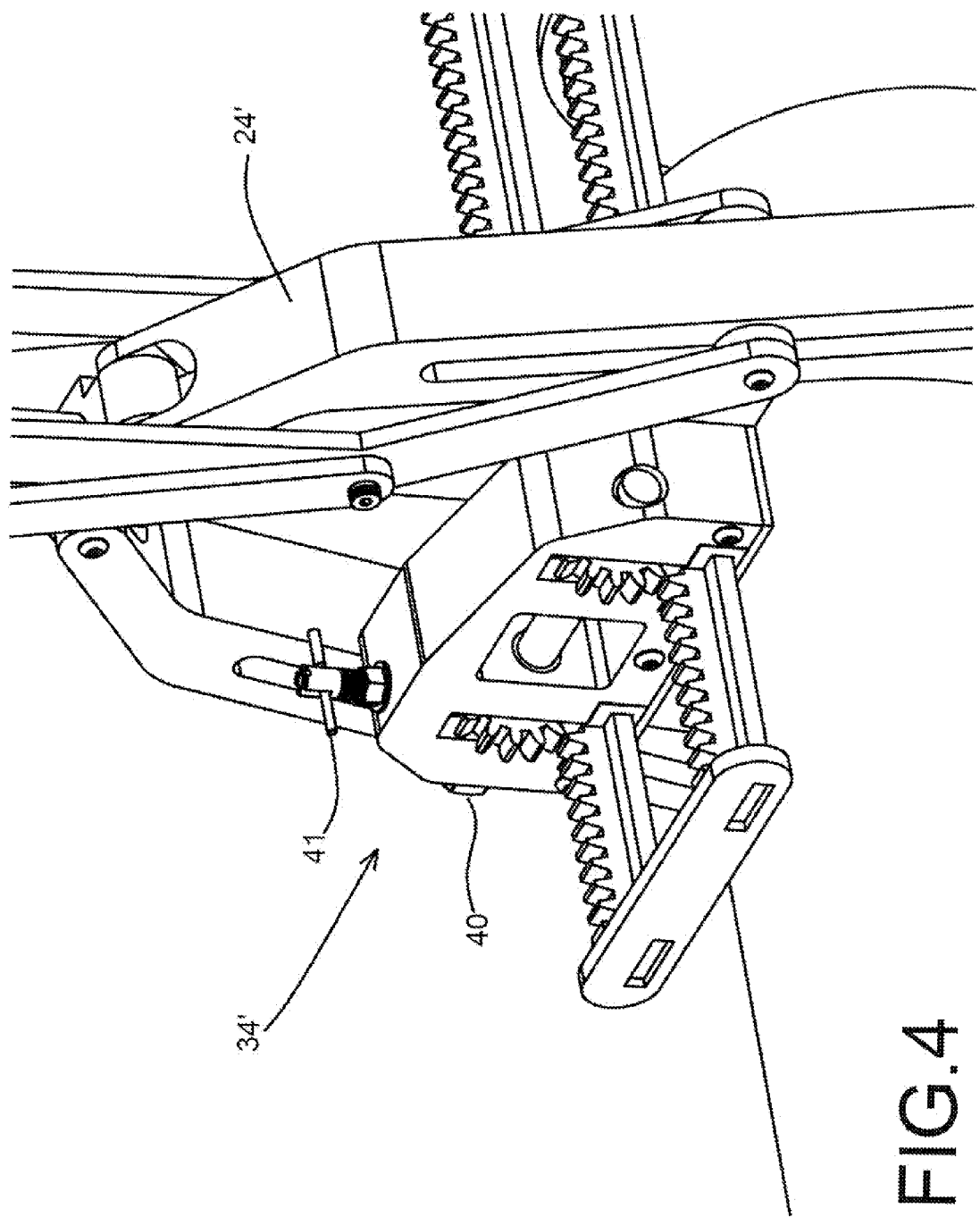
Figure 5:
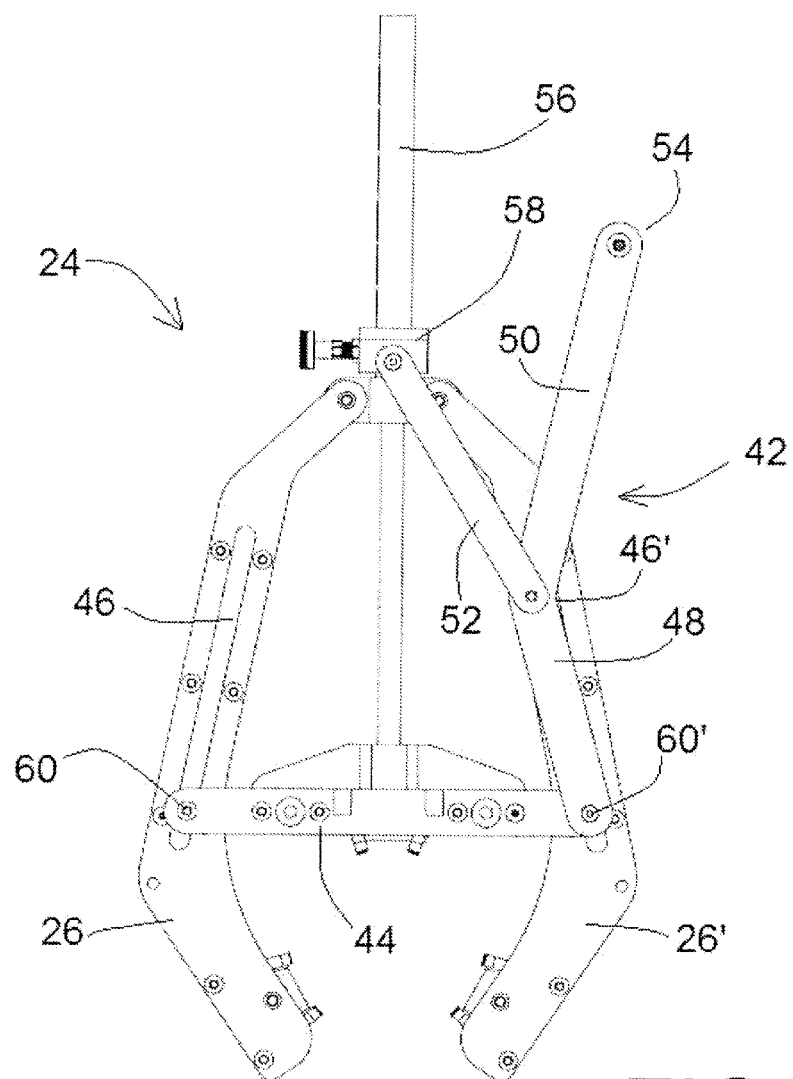
Figure 6:
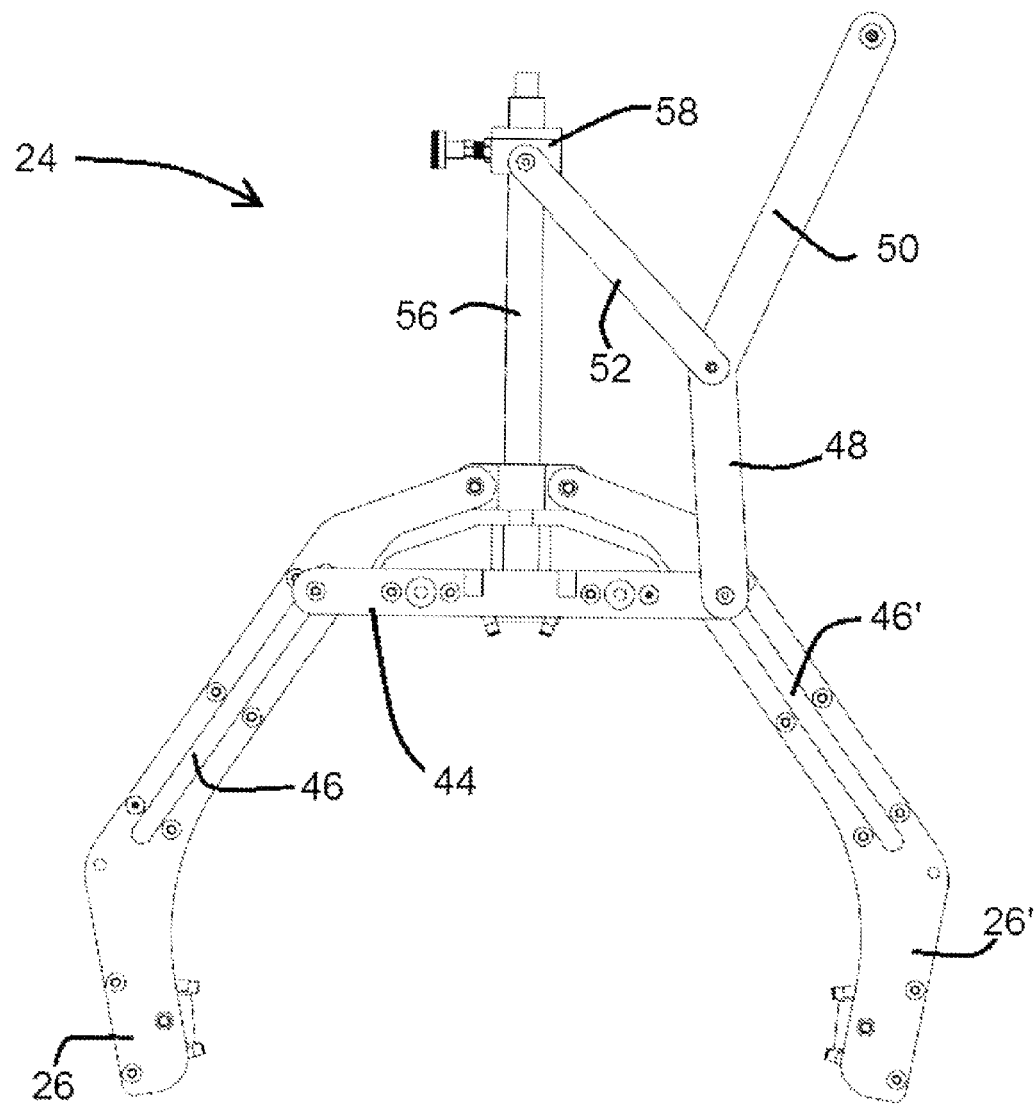
Figure 7:
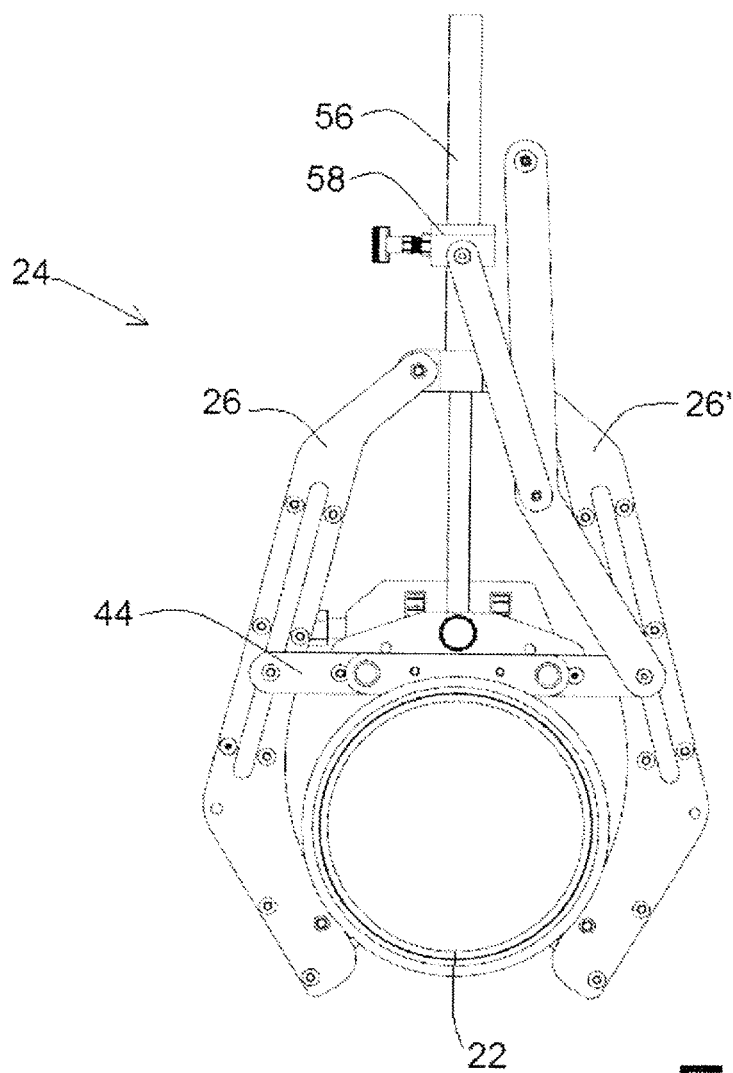
Figure 8:
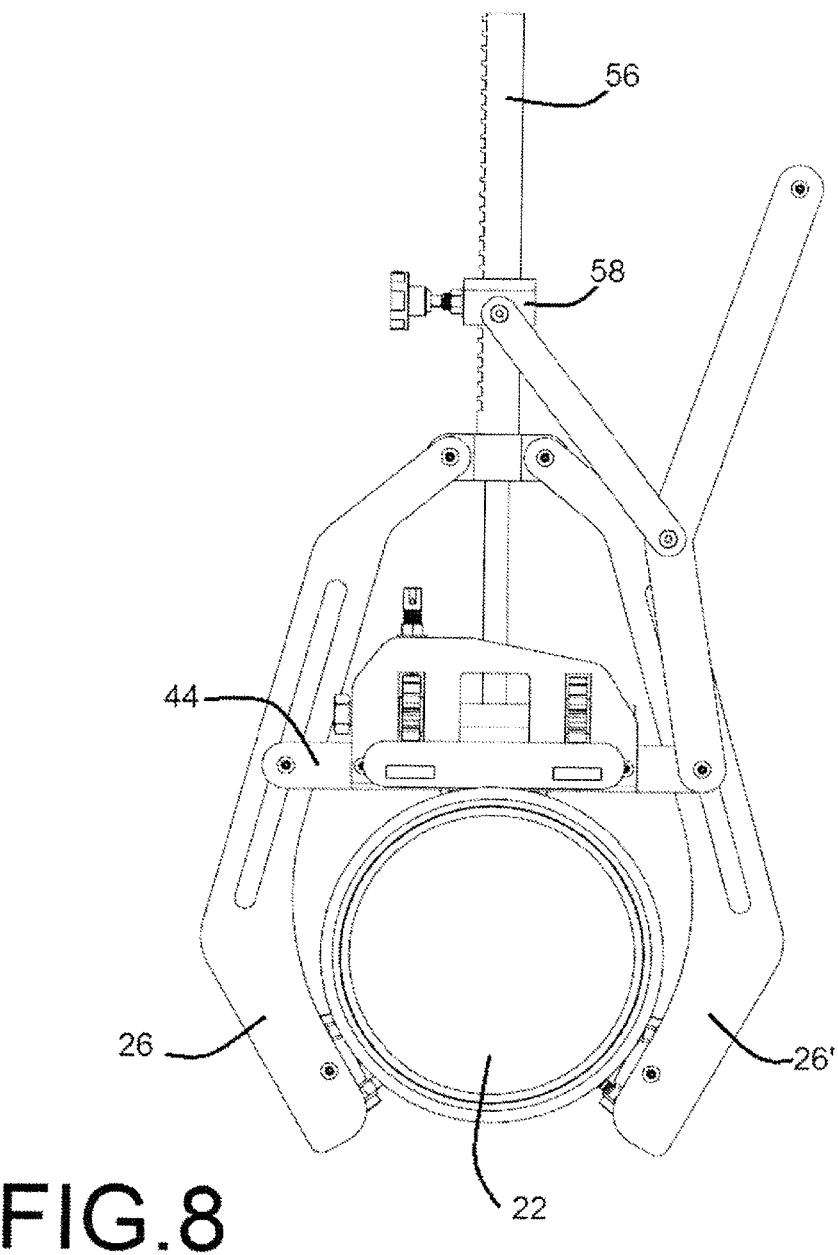

FIG. 1 is a perspective view of a first model of the device in use.
FIG. 2 i is a perspective view of a second model of the device in use.
FIG. 3 is an enlarged view of the means of stalks of the first model.
FIG. 4 is an enlarged view of the means of stalks of the second model.
FIG. 5 is a face view of a jaw with claws and positioning stalks's.
FIG. 6 is a view of a jaw having the widest opening of claws.
FIG. 7 is a face view of a jaw holding a pipe.
FIG. 8 is another face view of a jaw holding a pipe.

DETAILED DESCRIPTION OF THE PREFERRED EMBODIMENTS

In the following description and in the accompanying drawings, the numeral numbers refer to identical parts in the various Figures.

FIG. 1 shows the device 20 joining the pipe 22 with the pipe 22'. The device has two parallel jaws 24,24' to hold the pipes, each jaw has two claws 26,26', one of the jaw is fixed 24 and the other is mobile 24'. The jaws are in combination with means of displacement rods 28 comprising two smooth rods 30,30' and two rods provided with means of rack 32,32' on which a means of pinions 34 is moving and pulling the mobile jaw toward the fixed jaw. The means of pinions comprise two pinions 36,36' corresponding to racks 32,32'. A knob 40 is shown on the means of pinion for rolling and fixing a desired position of the mobile jaw. Each jaw is having spacing means 42 for opening their claws to adapt the opening of the jaw to the section of the pipe. Means of spacing comprise a spacing bar 44 transversally disposed between the claws and sliding along longitudinal slots 46,46' made along the claws. The pipe held by the jaw is filling the space between the claws and under the spacing bar. One sees an handle 54 activating a stalk 50 pivotedly connected with a first stalk 48 and with, a second stalk 52; the first stalk 48 actionning the spacing bar 44 and the second stalk 52 is connected with means of fastening 58 disposed in height and used to fix a position of the spacing stalk on the slots of the claws.

When actionning the handle 54 the first stalk 48 slides the spacing bar 44 along the claws for adapting their opening to the corresponding pipe section, and the second stalk 52 linked to means of fastening 58 firmly maintains in place the spacing bar at the chosen position along the claws. FIG. 2 shows a device 20' looking almost like the device 20 of FIG. 1 except for the location of the means of pinions 34' which is not placed between the two jaws but behind the mobile jaw 24' for not interfering with the junction of pipes. A stopping device 41 is used apart from the knob 40. Furthermore, the means of rods comprise only rods having means of rack 32,32' on which the pinions are moving.

FIG. 3 shows an enlarged view of the means of stalks 28; one can see the smooth rods 30,30', and the means of pinions 34 having pinions 36,36' rolling along the racked rods 32,32' and pulling the mobile jaw 24' toward the fixed jaw. The stopping device 40 of the means of pinions is also shown.

FIG. 4 shows an enlarged view of the means of stalks of the device 20', wherein the means of pinions is placed behind the mobile jaw 24' for not interfering with the junction of the pipes.

FIG. 5 shows a jaw 24 comprising two claws 26,26' provided with longitudinal slots 46,46' made along the claws and on which slides the transversal spacing bar 44. One see the handle 54 actionning the spacing bar 44 via the set 42 of stalks 48, 50, 52; a handle stalk 50 directly linked to the handle and actionning a first stalk 48 which moves the transversal spacing bar 44 along longitudinal slots 46,46'; and the second stalk 52 used to maintain in height the spacing bar 44 by fixing 58 the top rod position 56.

One sees means of screw 60,60' located at both ends of the spacing bar 44 which are inserted inside the longitudinal slots 46,46' and thus making slide the spacing bar along the slots.

FIG. 6 shows the jaw 24 having the widest opening made by the pulling of the spacing bar 44 as high as possible along the openings 46,46' of the claws 26,26'.

FIG. 7 shows the jaw 24 holding a pipe 22 enclosed between the two claws 26,26' and the spacing bar 44. The position of the spacing bar is firmly fixed 58 on the graduated top rod 56.

FIG. 8 shows an identic jaw as in FIG. 7 but with the top rod 56 presenting rectangular graduations used to fix 58 the spacing bar position 44.

SUMMARY

A pipe joiner 20 device used to join two pipes 22,22' put end to end, the device comprising:
  two jaws 24,24' holding the pipes, in combination with means of rods 28 linking the two jaws, at least one rod is provided with rack means 32. A first jaw is fixed 24 and the second is mobile 24'.
  The means of rods 28 may comprise at least one smooth rod 30 and other rods 32 provided with rack means.
  Means of pinions 34 is moving along the rack means 32 while pulling the mobile jaw 24' towards the fixed jaw 24 until the pipes are joined. The means of pinions comprise two pinions 36,36' and a knob 40 used to roll and stop the pinions at a chosen position in the rack means. A stopping device 41 may be installed apart from the knob.

Each jaw comprises a pair of claws 26,26' and means for spacing 42 the claws for enclosing a section of either pipe.

The pipe claws are provided with longitudinal slots 46,46' and the means of spacing 42 the claws comprise:
  A spacing bar 44 provided with means of screws 60,60' at both ends, the spacing bar being transversally disposed between the claws, and the means of screws being inserted inside the slots 46,46' for sliding along the slots, thus maintaining the claws spaced for enclosing the pipe section:
  A handle 54 actionning a handle stalk 50 pivotedly linked to a first stalk 48 and a second stalk 52, the first stalk being moving the spacing bar and the second stalk being linked to means of fastening 58 disposed in height;
  When actionning the handle, the first stalk displaces the spacing bar along the slots of the claws for enclosing the sections of pipes intended to be joined.

The spacing bar is maintained at position by the means of fastening, and the pipes is tightened and enclosed inside a space formed between the claws and the spacing bar. The means of fastening 58 comprise a graduated top rod 56 generally disposed normal to the spacing bar and comprising means to keep the second stalk 52 in position, thus firmly maintaining the spacing bar in place.

The claws may be toothed for adherence to the pipes.

For two pipes 22,22' having different sections, each jaw may be adapted to hold the different sections. The mobile jaw 24' will hold one of the pipe having a smaller section and the mobile jaw will move towards the fixed jaw 24 until junction of the smaller section in the bigger section of pipe.

It is to be clearly understood that the instant description with reference to the annexed drawing is made in an indicative manner and that the preferred embodiments described herein are meant in no way to limit further embodiments realizable within the scope of the invention. The matter which is claimed as being inventive and new is limited only by the following claims.

PARTS 20,20' Pipe joiner device
22,22' Pipes
24 Fixed jaw
24' Mobile jaw
26,26' Two claws of a jaw
28 Means of rods
30,30' Smooth rods
32,32' Rods provided with racks means
34,34' Means of pinions
36,36' Pinions
40 Knob
41 Stopping device
42 Means of spacing the claws
44 Spacing bar of claws 26,26'
46,46' Longitudinal slots made along the claws
48 First stalk
50 Handle stalk
52 Second stalk
54 Handle
56 Graduated top rod
58 Means of fastening
60,60' Means of screws

I claim:

1. A pipe joiner (20) device used to join two pipes (22, 22') put end to end and comprising two jaws (24, 24') holding said pipes in combination with means of rods (28) linking said two jaws, at least one rod being provided with rack means (32); one of said two jaws being fixed (24) and the other jaw being mobile (24') and being pulled towards said fixed jaw by means of pinions (34) moving along said rack means (34) until said pipes are joined; said each jaw comprising a pair of claws (26, 26') and means for spacing (42) said claws for enclosing a section of either pipe, wherein said claws comprise longitudinal slots (46, 46'), and said means of spacing (42) said claws comprise:
  a spacing bar (44) provided with means of screw (60, 60') at both ends, said spacing bar being transversally disposed between said claws, and said means of screws being inserted within said longitudinal slots (46, 46') for sliding along said slots, thus maintaining said claws spaced for enclosing said section of pipe;
  a handle (54) actionning a handle stalk (50) pivotedly linked to a first stalk (48) and to a second stalk (52), said first stalk being moving said spacing bar and said second stalk being linked to means of fastening (58) disposed above said claw;
  wherein, by actionning said handle (54), said first stalk displacing said spacing bar along said slots of said claws for enclosing said pipe section intended to be joined; said spacing bar being maintained at position by said means of fastening, each of said pipes being tightened and enclosed within a space formed between said claws and said spacing bar.

2. The pipe joiner of claim 1 wherein said means of pinions comprise a stopping device for fixing a position of said mobile jaw on said rod means.

3. The pipe joiner of claim 1 wherein said means of rods (28) comprise at least one smooth rod (30).

4. The pipe joiner of claim 1 wherein said means of fastening (58) comprise a graduated top rod (56) generally disposed normal to said spacing bar and comprising means to keep said second stalk (52) in position, thus firmly maintaining said spacing bar in place.

5. The pipe joiner of claim 1 wherein said claws are toothed for furthering adherence of said pipes.

* * * * *